Figure 1:
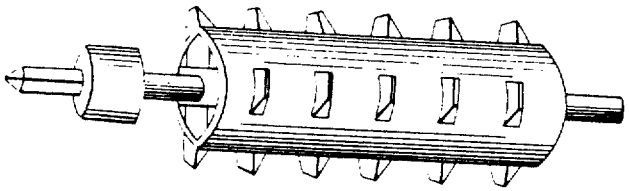
Figure 3:
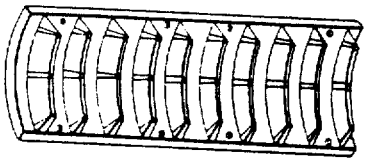
Figure 2:
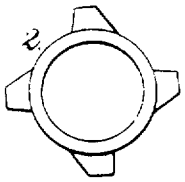
Figure 4:
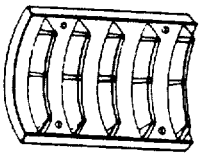
Figure 5:
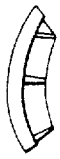
Figure 6:
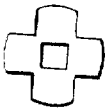
Figure 7:
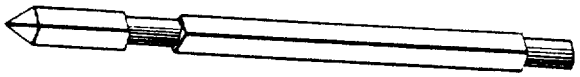
Figure 8:
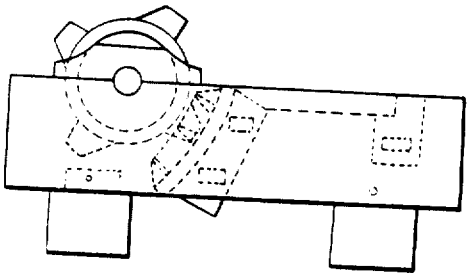

EX

X 9363

X 9363

L. H. MAUS.

Thrashing Machine.

Patented Feb. 5, 1836.

Inventor

Lewis H Maus

9363x Feb 5, 1836

Lewis H. Maas. Danville Pennsylvania

Letters Patent

The Schedule referred to in these Letters Patent and making part of
the same containing a description in the words of the said Lewis H. Maas
himself of his improvement in the cast iron thrashing machine for thrash-
ing Grain or cracking Corn in the ear.

To all to whom these presents shall come. Be it known that I,
Lewis H. Maas of Danville in the County of Columbia and State of
Pennsylvania have invented a new and useful improvement on the
construction of cast iron thrashing machines. for thrashing wheat, Rye, oats
and small seeds or to crack corn in the ear for the purpose of preparing it to
feed cattle, and that the following is a full and exact description thereof.
Specification. 1st I make a cast iron cylinder in one piece, with one
end cast fast to the cylinder. which has a square hole in its centre for to
insert an iron shaft. the iron cylinder is cast hollow with teeth or points
in regular rows on its outside or convex side and in a straight line one end
of the cylinder being open. I cast an iron head with a square hole in its
centre for the iron shaft before mentioned to pass through. this head is
fitted into the open end of the cylinder and fastened with screws and nuts
the cylinder when completed is hung or balanced on the aforementioned iron
shaft (see the model). 2nd I make a concave of cast iron which I
cast in sections with 5. 6. 7. 8 or 9 teeth on each section. and to
correspond in length and breadth so as to form a straight line with each
row (see model). The cylinder used in James Bowen's Threshing Machine
is cast in rounds one and a half inches thick with the teeth on the edge
and hung on an iron bar passing through the middle. the great objection
to this mode of construction are first its weight which requires expensive
power to keep it in motion. This my invention obviates, by not being so
heavy and the weight being principally on the outside of the circle of
the cylinder. 2nd the cylinder being cast in rounds the teeth or points 9363x Feb 5, 1836 cannot be made of equal length or height in a line which prevents the con-
cave being let down to the concave for the threshing small grain this my in-
vention obviates by the teeth or points being all in a line on each row so that
it can be let down or raised at the pleasure of the persons using it. 3rd
the [illegible] being cast in sections instead of each point being cast by itself
facilitates the building of the machine by saving labour & also tends
to its more general use the points being all of a length and in a line
4th My invention having the Cylinder cast in one piece is much
cheaper requiring [illegible] less weight of castings and less labour in its construction.
Danville Columbia County Pennsylvania November 20th 18[illegible].

Exd. Witnesses

W.G.C. David Petrikin

A. C. Petrikin

Lewis H. Manz

[5(54 words)

Drawing